US012750894B2

(12) United States Patent
Fei et al.

(10) Patent No.: US 12,750,894 B2
(45) Date of Patent: Sep. 29, 2026

(54) NETWORK CONNECTION EXCEPTION PROCESSING METHOD, ELECTRONIC DEVICE, AND STORAGE MEDIUM

(71) Applicant: ZTE CORPORATION, Shenzhen (CN)

(72) Inventors: Teng Fei, Shenzhen (CN); Shouyong Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 346 days.

(21) Appl. No.: 18/276,663

(22) PCT Filed: May 6, 2022

(86) PCT No.: PCT/CN2022/091325
§ 371 (c)(1),
(2) Date: Aug. 10, 2023

(87) PCT Pub. No.: WO2022/237658
PCT Pub. Date: Nov. 17, 2022

(65) Prior Publication Data
US 2024/0114563 A1 Apr. 4, 2024

(30) Foreign Application Priority Data
May 11, 2021 (CN) ......................... 202110513277.4

(51) Int. Cl.
*H04W 76/10* (2018.01)
*H04W 36/08* (2009.01)
(Continued)

(52) U.S. Cl.
CPC ......... *H04W 76/10* (2018.02); *H04W 36/087* (2023.05); *H04W 48/10* (2013.01); *H04W 88/10* (2013.01)

(58) Field of Classification Search
None
See application file for complete search history.

(56) References Cited

U.S. PATENT DOCUMENTS

2021/0045170 A1 2/2021 Luo et al.

FOREIGN PATENT DOCUMENTS

CN 102026243 A 4/2011
CN 108370535 A 8/2018
(Continued)

OTHER PUBLICATIONS

Nokia et al:"Discussion onNSA-SA Cell Operation",3GPP Draft;R3-206645 , 3rdGENERATION PARTNERSHIPPROJECT (3GPP) , Mobile Competence Centre; 650 , Route Des Lucioles; F-06921 Sophia-Antipolis Cedex; France, vol. RAN WG3,No. E-Meeting;Nov. 2, 2020-Nov. 12, 2020 Oct. 23, 2020 (Oct. 23, 2020) , XP052399664 , Retrieved from the Internet: URL:https://ftp.3gpp.org/tsg_ran/WG3_Iu/TSGR3_110-e/Docs/R3-206645.zip R3-206645 Disc NSA-SA Cell Operation.doc [retrieved on Oct. 23, 2020].
(Continued)

*Primary Examiner* — Christine T Duong
(74) *Attorney, Agent, or Firm* — NZ Carr Law Office

(57) ABSTRACT

Disclosed are a network connection exception processing method, an electronic device, and a storage medium. The method is applied to a DU of a dual-mode base station, which is simultaneously used in an SA network and an NSA network, and comprises a DU and a CU in communication connection; the CU is configured to separately establish a connection to a first core network and a second core network, and the DU implements data transmission between an SA user end and the first core network and data transmission between an NSA user end and the second core network. The method comprises: after receiving first core network connection exception information sent by the CU, sending a
(Continued)

notification of a connection exception between each subordinate cell and the first core network for the SA user end to read and update, access information of each cell according to the notification, and re-perform cell selection.

10 Claims, 6 Drawing Sheets

(51) Int. Cl.
*H04W 48/10* (2009.01)
*H04W 88/10* (2009.01)

(56) References Cited

FOREIGN PATENT DOCUMENTS

| | | | | | |
|---|---|---|---|---|---|
| CN | 111586886 | A | | 8/2020 | |
| CN | 111988831 | A | | 11/2020 | |
| WO | 2015049007 | A1 | | 4/2015 | |
| WO | WO-2021026704 | A1 | * | 2/2021 | ............ H04W 76/11 |
| WO | WO-2021030186 | A1 | * | 2/2021 | ............ H04W 76/27 |

OTHER PUBLICATIONS

Ericsson:"Available PLMN:summary of offline discussions", 3GPP Draft; R3-184253Available PLMN ID Summary, 3rd Generation Partnership Project (3GPP) , Mobile Competence Centre ;650 , Route Des Lucioles; F-06921 Sophia-Antipolis Cedex; France, vol. RAN WG3, No. Montreal , Canada; Jul. 10, 2018(Jul. 10, 2018) , XP051530098 , Retrieved from the Internet: URL: http://www.3gpp.org/ftp/tsgq%5Fran/WG3%5Flu/TSGR3%5FAHGs/R3%2DAH%2D1807/Docs/R3%2D18425382Ezip [retrieved on Jul. 10, 2018] *paragraph [0002].
The extended European search report of the corresponding EP Patent Application No. 22806624.7 dated Mar. 12, 2025.
ISA/237) Written Opinion of the International Searching Authority dated Aug. 5, 2022.
The international search report of the corresponding PCT Application No. PCT/CN2022/091325 mailed on Aug. 5, 2022 along with English translation thereof.
Ericsson. "R3-184099" PLMN information over F1 3GPP TSG RAN WG3 NR AH 18-07, Jul. 6, 2018 (Jul. 6, 2018) , Section 1-3.
ZTE. "R3-184661" Discussion on PLMN and TAC transmission over F1 3GPP TSG RAN WG3 NR#101, Aug. 17, 2018 (Aug. 17, 2018) Section 2.
Ericsson, R3-184100 "PLMN information over F1".

* cited by examiner

NETWORK CONNECTION EXCEPTION PROCESSING METHOD, ELECTRONIC DEVICE, AND STORAGE MEDIUM

CROSS REFERENCE TO RELATED APPLICATIONS

This application is based upon and claims priority to Chinese Patent Application No. 202110513277.4, filed on May 11, 2021, the entire contents of which are incorporated herein by reference.

TECHNICAL FIELD

Embodiments of the present application relate to the field of communication, and particularly relate to a network connection exception processing method, an electronic device and a storage medium.

BACKGROUND

The mobile communication develops constantly, are involved in various aspects of people's work, social contact and life, and brings huge influence to people's lifestyle, working manner, and various aspects of social politics, economy, etc. The human society enters the information era, and the demand for business applications in various aspects exhibits an explosive increase, and in order to provide better mobile communication services, the 5G access network introduces an architecture in which a centralized unit (CU) and a distributed unit (DU) are separated.

In the network connection exception processing under the architecture in which the CU and the DU are separated, if the CU and a 5G core cannot be connected, the CU instructs the DU to stop the service of all subordinate cells, and all user ends accessing the services of the individual cells need to re-perform cell selection, i.e., migrate to other cells.

However, the network connection exception processing has the following problems: a base station does not provide a network connection service for an NSA user end and an SA user end, and the NSA user end and the SA user end both need to perform cell selection. Although it can be guaranteed that both the NSA user end and the SA user end successfully access an available network, the overall network access efficiency is low, and the base station is low in utilization efficiency.

SUMMARY

An embodiment of the present application provides a network connection exception processing method applied to a distributed unit (DU) of a dual-mode base station. The dual-mode base station is configured for a standalone (SA) network and a non-standalone (NSA) network simultaneously, and includes the DU and a centralized unit (CU) that are in communication connection. The CU is configured to establish a connection with a first core network and a second core network, respectively, and perform data transmission between an SA user end and the first core network, and data transmission between an NSA user end and the second core network through the DU. The method includes: sending, after receiving first core network connection exception information sent by the CU, a notification of connection exception between each cell and the first core network for the SA user end to read and update access information of each cell according to the notification of connection exception, and re-perform cell selection.

An embodiment of this application further provides a network connection exception processing method applied to a centralized unit (CU) of a dual-mode base station. The dual-mode base station is configured for a standalone (SA) network and a non-standalone (NSA) network simultaneously, and includes a distributed unit (DU) and the CU that are in communication connection. The CU is configured to establish a connection with a first core network and a second core network, respectively, and perform data transmission between a SA user end and the first core network, and data transmission between an NSA user end and the second core network through the DU. The method includes sending, after detecting abnormal connection with the first core network, a notification of connection exception between each subordinate cell and the first core network for the SA user end, wherein the notification of connection exception is configured to instruct the SA user to update access information of each cell and re-perform cell selection.

An embodiment of the present application further provides a network connection exception processing method applied to an SA user end that performs data transmission with a first core network through a dual-mode base station. The dual-mode base station is configured for a standalone (SA) network and a non-standalone (NSA) network simultaneously, and includes a distributed unit (DU) and a centralized unit (CU) that are in communication connection. The CU is configured to establish connection with a first core network and a second core network, respectively, and to perform data transmission between the SA user end and the first core network, and data transmission between an NSA user end and the second core network through the DU. The method includes: updating, after receiving a notification of connection exception between each subordinate cell and the first core network sent by the DU, access information of each cell according to the notification of connection exception, and re-performing cell selection, wherein the notification of connection exception is sent by the DU after receiving first core network connection exception information sent by the CU.

An embodiment of the present application further provides an electronic device, including: at least one processor, and a memory in communication connection with the at least one processor. The memory stores instructions executable by the at least one processor, and the instructions are executed by the at least one processor, such that the at least one processor may perform the above network connection exception processing method.

An embodiment of the present application further provides a computer-readable storage medium storing a computer program. The computer program, when executed by a processor, implements the above network connection exception processing method.

DETAILED DESCRIPTION

In order to make the objectives, technical solutions and advantages of the embodiments of the present application more clear, various embodiments of the present application will be described in detail below in conjunction with the drawings. However, those of ordinary skill in the art may appreciate that numerous technical details are set forth in various embodiments of the present application in order that readers better understand the present application. However, the technical solutions claimed in the present application may be implemented without these technical details and various variations and modifications based on the following embodiments. The following division of various embodiments is for convenience of description and should not be construed as limiting the specific implementations of the present application, and various embodiments may be cited mutually without contradiction.

A main objective of the embodiments of the present application is to provide a network connection exception processing method, an electronic device and a storage medium, which are configured to guarantee that an NSA user end and an SA user end both successfully access an available network, and at the same time improve overall network access efficiency and device utilization.

According to the network connection exception processing method provided by the present application, by setting that the DU, after receiving the first core network connection exception information sent by the CU, sends the notification of connection exception between each subordinate cell and the first core network, instead of stopping the service of all the subordinate cells, for the SA user end to update access information of each cell, and re-perform cell selection, so that successful access of the SA user end to the available network is guaranteed, and at the same time, since not all the subordinate cells are stopped from service, the connection between the CU and the second core network can be completed after receiving an NSA dual-connection establishment request, so as to enable the NSA user end to still transmit data using the original cell, thereby improving the overall network access efficiency and equipment utilization while guaranteeing successful access of the NSA user end and the SA user end to the available network.

An embodiment of the present application relates to a network connection exception processing method applied to a distributed unit ("DU" for short), specifically including:

- after receiving first core network connection exception information sent by a centralized unit (CU), a notification of connection exception between each subordinate cell and a first core network is sent for an SA user end to read and update access information of each cell according to the notification of connection exception and to re-perform cell selection.

Figure 1:
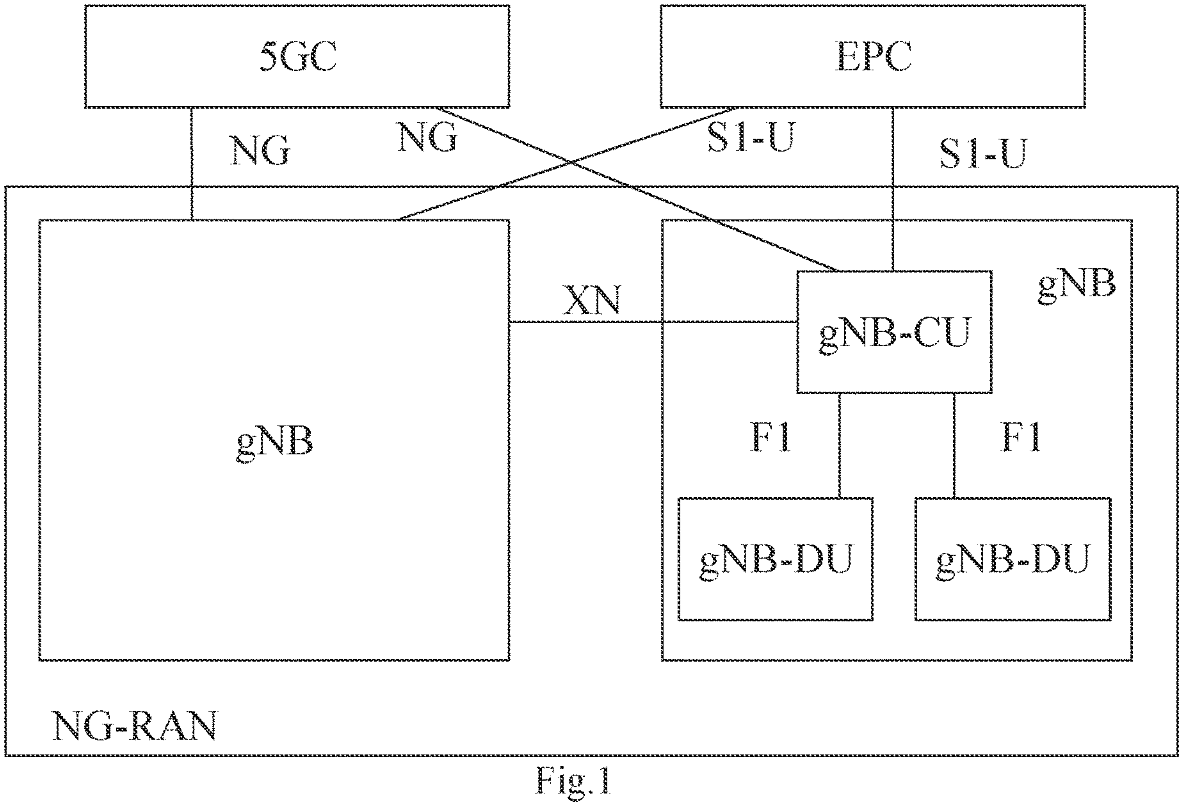
FIG. 1 is a schematic diagram of an access network architecture using a gNB provided by an embodiment of the present application.
Figure 2:
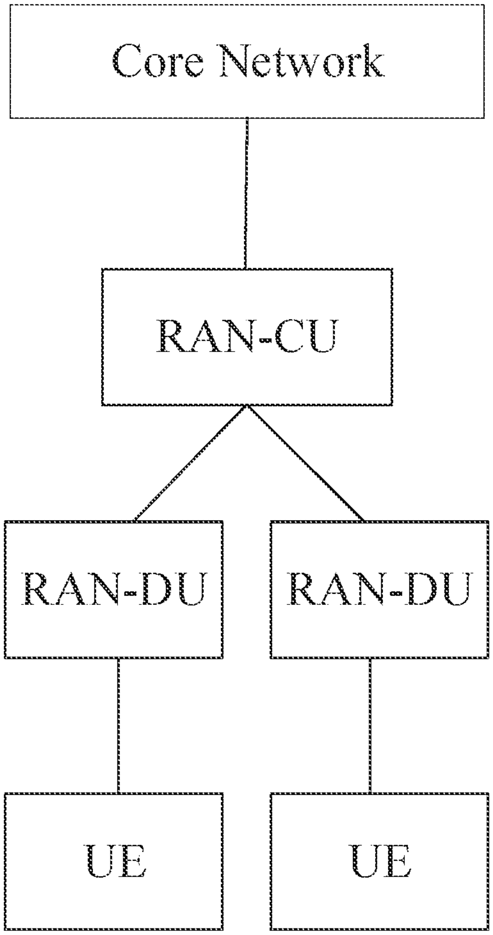
FIG. 2 is a schematic diagram of a CU-DU separation architecture provided by an embodiment of the present application.
Figure 3:
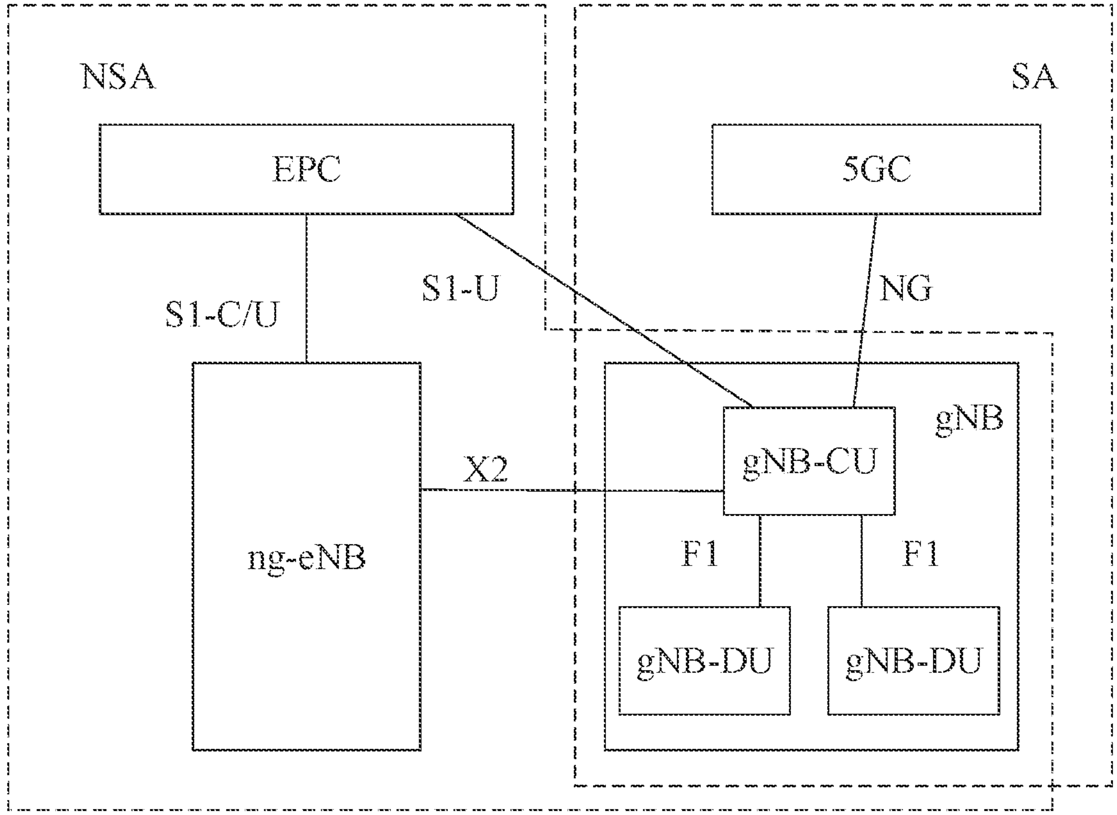
FIG. 3 is a schematic diagram of an NSA/SA hybrid network architecture provided by an embodiment of the present application.

The network connection exception processing method of the embodiment is applied to a dual-mode base station in an access network, for example, a 5G dual-mode base station shown in FIG. 1. The dual-mode base station is configured for a standalone (SA) network and a non-standalone (NSA) network simultaneously, and includes a distributed unit (DU) and a centralized unit (CU) that are in communication connection. The CU is configured to establish connection with a first core network and a second core network, respectively, and to perform data transmission between an SA user end and the first core network and data transmission between an NSA user end and the second core network through the DU. The SA user end is a user end accessing a network service by the SA network, and the NSA user end is a user end accessing a network service by the NSA network. The first core network may be a 5G core, and the second core network may be a 4G core. For a DU of a 5G dual-mode base station gNB as shown in FIG. 1, if RAN employs a CU-DU separation architecture, the base station is divided into two parts: RAN-CU and RAN-DU, as shown in FIG. 2. A user end, i.e., user equipment ("UE"), may be connected with the DU, and may be connected with a core network (i.e., the first core network or the second core network) based on the DU and a centralized unit ("CU" for short) to obtain network services. In the 5G base station gNB, the DU is also referred to as gNB-DU, and the CU is also referred to as gNB-CU. As shown in FIG. 1, there are a plurality of gNBs in a 5G radio access network NG-RAN, wherein gNB-DU and gNB-CU in gNB are in communication connection, gNB-CU is connected with a 5G core through an NG interface, and is connected with a 4G core through an S1-U interface, and gNB-DU is connected with the gNB-CU through an F1 interface, and is connected with other base stations through an XN interface. The gNB-DU is mainly responsible for NR cell-related control and management, as well as part of UE-related control and management, for example, broadcasting of cell system information, dynamic scheduling of cell radio resources, random access processing of UE, etc. The gNB-CU is mainly responsible for global gNB control and management, as well as part of UE-related control and management, for example, NG interface management, XN interface management, UE's idle state mobility management, UE's connection state mobility management, etc. In the embodiment, the DU may be connected with the SA user end and the NSA user end since the 5G dual-mode base station supports both an SA network architecture and NSA network architecture. The DU notifies the CU to establish connection between the SA user end and the 5G core after receiving a connection request sent by the SA user end. Data transmission between the 5G core and the SA user end is completed by the CU and the DU after the connection is established between the SA user end and the 5G core. The CU establishes connection between the CU and the 4G core by receiving a dual-connection establishment request sent by a 4G base station ng-eNB through an X2 interface when the NSA user end needs to establish dual connection with the 4G core, thereby establishing connection between the NSA user end and the 4G core. Data transmission between the 4G core and the NSA user end is completed by the CU and the DU after the connection is established between the NSA user end and the 4G core. As shown in FIG. 3, the 5G dual-mode base station is used in both standalone ("SA" for short) network architecture and non-standalone ("NSA") network architecture, i.e., an NSA/SA hybrid network architecture. SA means that a wireless side employs a 5G base station gNB or an enhanced 4G base station ng-eNB. In FIG. 3, by taking gNB as an example for description, the core network employs a CU for a network architecture gNB of a 5G core ("5GC" for short), and the CU is connected with the 5G core through an NG interface. NSA means that a 4G base station and a 5G base station co-exist at a wireless side. The core network employs a network architecture of a 4G core, i.e., an evolved packet core ("EPC" for short) or a network architecture of a 5G core, and a CU of ng-eNB is connected with the 4G core through an S1-U interface, and is connected with the gNB through an X2 interface, and the gNB is connected with the 4G core through an S1-U interface.

If the NG interface is interrupted due to a transmission failure or the like, user equipment accessing to the service of each subordinate cell of the DU cannot make a network connection with the 5G core due to an abnormal interruption in the network connection between the gNB and the 5G core. Based on a 3GPP F1 interface protocol, gNB-CU may only instruct gNB-DU to stop the services of the cells by deleting all activated cells or deleting an F1 interface, resulting in that both the NSA user end and the SA user end accessing the services of the cells need to re-perform cell selection. Whereas, for a dual-mode base station supporting NSA and SA, the exception of the NG interface only affects the network connection at the SA user end and does not affect the network connection at the NSA user end. If the DU stops services of all the subordinate cells, both the SA user end and the NSA user end need to re-perform cell selection to access an available network. In the embodiment, only the SA user end re-performs cell selection and migrates out from the original cell when the network connection between the gNB and the 5G core is in exception. However, the NSA user end still accesses the network service through the original cell, and does not re-perform cell selection.

The implementation details of the network connection exception processing method of the embodiment are specifically described, and the following implementation details are provided only for convenience of understanding, and are not necessary to implement the embodiment.

The DU receives, from the F1 interface, first core network connection exception information sent by the CU. The first core network connection exception information may be sent to the DU in the form of a separate additional signaling message or may be provided in the form of an element set in signaling of other communication processes, and the first core network connection exception information may be carried in the signaling for other communication processes to be sent to the DU to notify the DU that a first core network element is not available or is not accessible. The DU sends a notification of connection exception between each subordinate cell and the first core network for an SA user end in an idle state, i.e., an SA user end in an IDLE state to read and update access information of each cell according to the notification of connection exception, to re-perform cell selection. Specifically, a connection exception notification message may be directionally sent by the DU to a subordinate SA user end. For example, the DU may send a connection exception notification message to a message receiving frequency band of the SA user end, or may set an element in a system message to indicate that a user end, which needs to be connected with a first core network element, no longer initiates access, re-performs cell selection, and migrates out from the subordinate cells of the DU. The set element may be a newly added element or may be obtained by modifying other elements.

In the embodiment, the DU, after receiving the first core network connection exception information sent by the CU, sends the notification of connection exception between each subordinate cell and the first core network, instead of stopping the services of all the subordinate cells, for the SA user end to update access information of each cell, and re-perform cell selection, so that successful access of the SA user end to the available network is guaranteed, and at the same time, since not all the subordinate cells are stopped from service, the connection between the CU and the second core network can be completed after receiving an NSA dual-connection establishment request, so as to enable the NSA user end to still transmit data using the original cell, thereby improving the overall network access efficiency and equipment utilization while guaranteeing successful access of the NSA user end and the SA user end to the available network.

In an example, in the signaling sent by the CU to the DU, element content for notifying the DU that a first core network element is not available or is not accessible may be a first public land mobile network ("PLMN" for short) list set by the CU. The DU further updates a stored second PLMN list based on the first PLMN list after receiving the first PLMN list, and the updated second PLMN list is carried in a periodically broadcasted system message. The second PLMN list is configured for the SA user end to select a PLMN identity before cell selection. Specifically, the updated second PLMN list may be carried in a master information block ("MIB") of a system message for reception and reading by the SA user end.

In an example, the first PLMN list may be set to have a length of 0, i.e., the first PLMN list is empty, and the DU, after receiving the first PLMN list, sets a length of the stored second PLMN list to also 0.

In another example, the first PLMN list may also be set to be that the length is not 0, but PLMN values in the list are all set to be invalid values.

By sending the set PLMN list to the DU by the CU, the DU updates the second stored PLMN list according to the received first PLMN list, and the updated second PLMN list is carried in a system message for the SA user end to read. Since the user end, when performing cell selection, needs to scan all frequency points first and find available PLMNs, and then selects a cell with a best signal belonging to the selected PLMN, the SA user end will not select the subordinate cells of the DU when re-performing cell selection by setting the PLMN to which each cell belongs to be not available, so that the SA user end selects other cells for network access. Whereas, the NSA user end obtains PLMN lists from the 4G base station covering the same cell, so that the NSA user end may continue to access the network service of the original cell without reselecting a cell, thereby improving the overall network access efficiency and equipment utilization while guaranteeing that both the NSA user end and the SA user end successfully access the available network.

In an example, the DU may also carry a cell barring information element, and/or a cell reservation information element indicating connection exception between each cell and the first core network in a periodically broadcasted system message, and carry the cell barring information element and/or a cell reservation information element configured to indicate each cell that is in connection exception with the first core network in the periodically broadcasted system message; wherein the cell barring element and the cell reservation element are located at a reading location for the SA user end in the system message. The DU does not cancel that the cell barring information element and/or the cell reservation information element are/is carried in the system message until receiving a normal connection notification of the first core network. For example, the DU may carry cell ID for each subordinate cell of the DU in the cell barring element and/or a cell reservation element. The DU sets the cell barring element and the cell reservation element to the reading location for the SA user end in the system message. That is, the DU notifies that the subordinate cells of the SA user end are changed to be barring cells and reservation cells in the system message to instruct the SA user end to re-perform cell selection and migrate to reside in other available cells.

In the embodiment, the cell barring element and/or the cell reservation element of each cell are carried in the periodically broadcasted system message, reducing the number of messages sent by the DU to the SA user end and saving system resources. Since the cell barring element and the cell reservation element are located at the reading location for the SA user end in the system message, it is guaranteed that the elements are read only by the SA user end, thereby guaranteeing that only the SA user end re-performs cell selection.

In an example, the DU, after sending the notification of connection exception to the SA user end, also sends a response message to the CU to notify the CU that the connection exception problem of the first core network has been processed.

In an example, for an SA user end in a connected state, i.e., a CONNECTED-state SA user end, the DU may release or switch the SA user end in the connected state to other base stations for network service.

Figure 4:
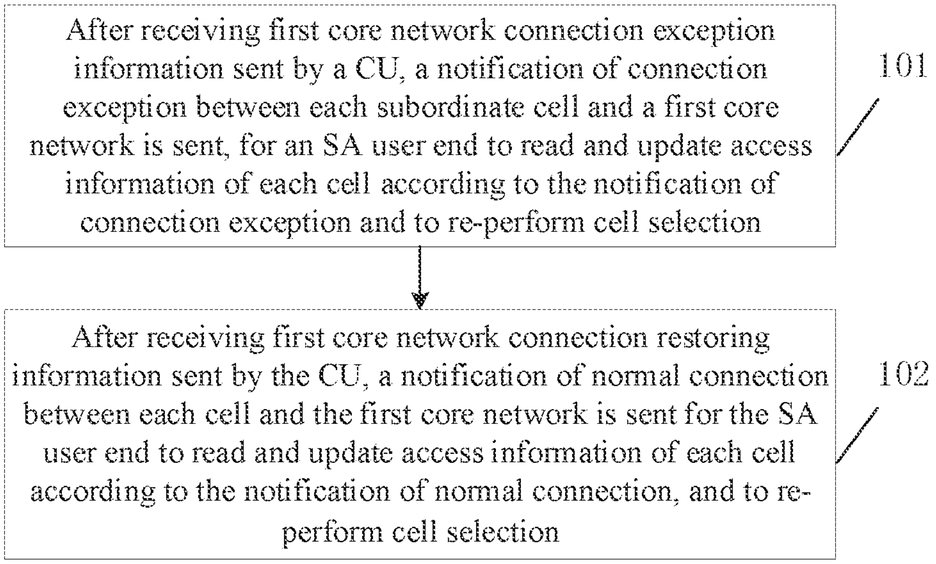
FIG. 4 is a flowchart of a network connection exception processing method applied to a DU provided by an embodiment of the present application.

In an example, as shown in FIG. 4, a network connection exception processing method applied to a DU, includes:

step 101, after receiving first core network connection exception information sent by a CU, a notification of connection exception between each subordinate cell and a first core network is sent, for an SA user end to read and update access information of each cell according to the notification of connection exception and to re-perform cell selection; and step 102, after receiving first core network connection restoring information sent by the CU, a notification of normal connection between each cell and the first core network is sent for the SA user end to read and update access information of each cell according to the notification of normal connection, and to re-perform cell selection.

Step 101 is the same as the above network connection exception processing method applied to the DU, which will not be described in detail.

Specifically, the first core network connection restoring information in step 102 may be sent to the DU in the form of a separate signaling message or may be provided in the form of a element set in signaling of other communication processes, and the first core network connection restoring information may be carried in the signaling for other communication processes to be sent to the DU to notify the DU that a first core network element restores availability and accessibility. The DU receives the first core network connection restoring information through an F1 interface. A connection restoring notification message may be directionally sent by the DU to a subordinate SA user end. For example, the DU may send a normal connection notification message to a message receiving frequency band of the SA user end, or may set an element in a system message to indicate that a user end, which needs to be connected with a first core network element, may initiate access again, re-performs cell selection, and migrates to the subordinate cells of the DU.

In an example, the element content configured for notifying the DU that the first core network element restores availability and accessibility in the signaling sent by the CU to the DU may be a first PLMN list set by the CU, and the first PLMN list is filled with all available PLMN information. The DU further updates a stored second PLMN list according to the first PLMN list after receiving the first PLMN list, and the updated second PLMN list is carried in the periodically broadcasted system message. The second PLMN list is used by the SA user end to select a PLMN identity prior to the cell selection. Specifically, the updated second PLMN list may be carried in a master information block ("MIB") of a system message for reception and reading by the SA user end.

In an example, the DU, after sending the notification of normal connection to the SA user end, also sends a response message to the CU to notify the CU that the connection restoring problem of the first core network has been processed.

In the embodiment, the DU updates the stored second PLMN list according to the received first PLMN list by sending the set PLMN list to the DU by the CU, and the updated second PLMN list is carried in the system message to be read by the SA user end, such that the SA user end migrates back to the original cell for residence when re-performing cell selection, thereby reducing the number of user ends accessing other cells, and further improving overall network access efficiency and equipment utilization.

An embodiment of the present application also relates to a network connection exception processing method applied to a centralized unit (CU), which specifically includes:

after detecting connection exception to a first core network, first core network connection exception information is sent to a distributed unit (DU) for the DU to send a notification of connection exception between each subordinate cell and the first core network, wherein the notification of connection exception is configured to instruct an SA user end to update access information of each cell, and to re-perform cell selection.

Specifically, the CU detects whether a connection with the first core network is available at a fixed period, and sends a first core network connection exception message to the DU immediately after detecting a connection exception to the first core network. The first core network connection exception information may be sent to the DU in the form of a separate signaling message or may be provided in the form of an element set in signaling of other communication processes, and the first core network connection exception information may be carried in the signaling for other communication processes to be sent to the DU to notify the DU that a first core network element is not available or is not accessible. The CU sends first core network connection restoring information through an F1 interface. The set element may be a newly added element or may be obtained by modifying other elements.

In an example, the element content may be a field directly indicating that the first core network element is not available or is not accessible, e.g., NG Interface state=Not Available.

In an example, in the signaling sent by the CU to the DU, the cell content configured for notifying the DU that the first core network element is not available or is not accessible may be a first PLMN list set by the CU, and the sent signaling is configured to instruct the DU to update a stored second PLMN list. The second PLMN list is configured to be carried in a system message periodically broadcasted by the DU for the SA user end to select a PLMN identity before performing cell selection.

Specifically, the CU may set the first PLMN list to have a length of 0, i.e., the first PLMN list is empty, and the DU, after receiving the first PLMN list, sets a length of the stored second PLMN list to also 0. Alternatively, the CU may also set the first PLMN list to have a length other than 0, but PLMN values in the list are all set to invalid values.

By sending the set PLMN list to the DU by the CU, the DU updates the second stored PLMN list according to the received first PLMN list, and the updated second PLMN list is carried in a system message for the SA user end to read. Since the user end, when performing cell selection, needs to scan all frequency points first and find available PLMNs, and then selects a cell with a best signal belonging to the selected PLMN, the SA user end will not select the subordinate cells of the DU when re-performing cell selection by setting the PLMN to which each cell belongs to be not available, so that the SA user end select other cells for network access. However, the NSA user end may obtain PLMN lists from other base stations covering the same cell, so that the NSA user end may continue to access the network service of the original cell without reselecting a cell, thereby improving the overall network access efficiency and equipment utilization while guaranteeing that both the NSA user end and the SA user end successfully access the available network.

In an example, the CU also receives a response message from the DU after the DU sends the notification of connection exception to the SA user end.

Figure 5:
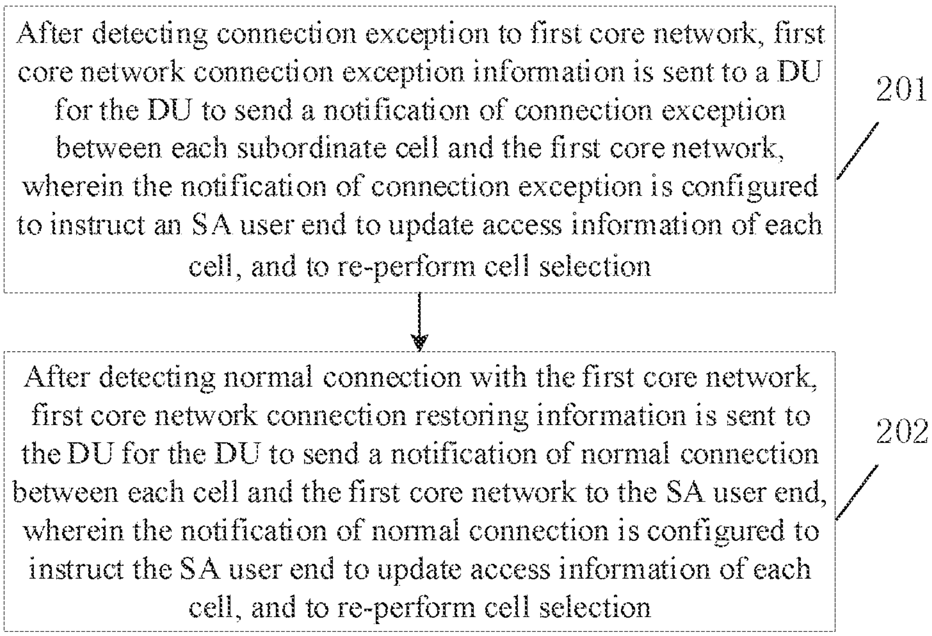
FIG. 5 is a flowchart of a network connection exception processing method applied to a CU provided by an embodiment of the present application.

In an example, a network connection exception processing method applied to a CU, as shown in FIG. 5, includes:

- step 201, after detecting connection exception to first core network, first core network connection exception information is sent to a DU for the DU to send a notification of connection exception between each subordinate cell and the first core network, wherein the notification of connection exception is configured to instruct an SA user end to update access information of each cell, and to re-perform cell selection; and
- step 202, after detecting normal connection with the first core network, first core network connection restoring information is sent to the DU for the DU to send a notification of normal connection between each cell and the first core network to the SA user end, wherein the notification of normal connection is configured to instruct the SA user end to update access information of each cell, and to re-perform cell selection.

Step 201 is the same as the above network connection exception processing method applied to the CU, which will not be described in detail.

Specifically, in step 202, the CU detects whether a connection with the first core network is available at a fixed period, and sends a first core network normal connection message to the DU immediately after detecting that a connection to the first core network restores to be normal. The first core network connection restoring information may be sent to the DU in the form of a separate signaling message or may be provided in the form of a element set in signaling of other communication processes, and the first core network connection restoring information may be carried in the signaling for other communication processes to be sent to the DU to notify the DU that a first core network element restores availability and accessibility. The CU sends first core network connection restoring information through an F1 interface.

In an example, the cell content may be a field directly indicating that the first core network element is available or accessible, e.g., NG Interface state=Available.

In an example, the element content configured for notifying the DU that the first core network element restores availability and accessibility in the signaling sent by the CU to the DU may be a first PLMN list set by the CU, and the first PLMN list is filled with all available PLMN information. The DU further updates a stored second PLMN list according to the first PLMN list after receiving the first PLMN list, and the updated second PLMN list is carried in the periodically broadcasted system message. The second PLMN list is used by the SA user end to select a PLMN identity prior to the cell selection.

In the embodiment, the DU updates the stored second PLMN list according to the received first PLMN list by sending the set PLMN list to the DU by the CU, and the updated second PLMN list is carried in the system message to be read by the SA user end, such that the SA user end selects PLMN of an original cell and migrates back to the original cell for residence when re-performing cell selection, thereby reducing the number of user ends accessing other cells, and further improving overall network access efficiency and equipment utilization.

In an example, the CU also receives a response message from the DU after the DU sends the notification of normal connection to the SA user end.

The CU sends the first core network connection exception information to the DU for the DU to send the notification of connection exception between each subordinate cell and the first core network, instructing the SA user end to update the access information of each cell, and to re-perform cell selection. Therefore, it may be guaranteed that the SA user end successfully accesses the available network service of other cells, and maintains the network connection service of the NSA user end, without re-performing cell selection for accessing the available network, thereby improving the overall network access efficiency and equipment utilization while guaranteeing successful access of the NSA user end and the SA user end to the available network.

An embodiment of the present application further relates to a network connection exception processing method applied to an SA user end, which specifically includes:

- after receiving a notification of connection exception between each subordinate cell and a first core network sent by a DU, access information of each cell according to the notification of connection exception is updated, and cell selection is re-performed, wherein the notification of connection exception is sent by the DU after receiving first core network connection exception information sent by a CU.

Specifically, the SA user end in the embodiment is an SA user end that is in an idle state and resides on each cell of the DU, and performs data transmission with the first core network through a dual-mode base station. The dual-mode base station is configured for a standalone (SA) network and a non-standalone (NSA) network simultaneously, and includes the distributed unit (DU) and the centralized unit (CU) that are in communication connection, and the CU is configured to establish connection with the first core network and the second core network, respectively, and to perform data transmission between the SA user end and the first core network and data transmission between the NSA user end and the second core network through the DU. The SA user end may receive the notification of connection exception sent by the DU from a specific message receiving frequency band.

In an example, the notification of connection exception may be an element that is carried in a system message and indicates the connection exception between each cell and the first core network, e.g., a cell barring information element, and/or a cell reservation information element. The cell barring information element and/or the cell reservation information element are/is carried in the periodically broadcasted system message. The cell barring information element and/or the cell reservation information element are/is configured to indicate each cell that is in connection exception with the first core network, wherein the cell barring element and the cell reservation element are located at a reading location for the SA user end in the system message. The DU does not cancel that the cell barring information element and/or the cell reservation information element are/is carried in the system message until receiving a normal connection notification of the first core network. the DU may carry cell ID for each subordinate cell of the DU in the cell barring element and/or the cell reservation element to be read by the SA user end, and the SA user end no longer attempts to access these cells and re-select other cells for accessing service.

In an example, in the signaling sent by the CU to the DU, element content for notifying the DU that a first core network element is not available or not accessible may be a first PLMN list set by the CU, and the DU updates a stored second PLMN list according to the first PLMN list after receiving the first PLMN list. The notification of connection exception may be that the updated second PLMN list is carried in a periodically broadcasted system message, and the second PLMN list is configured for the SA user end to select a PLMN identity before cell selection.

In this example, the SA user end reads the updated second PLMN list carried in the system message. Since the user end, when performing cell selection, needs to scan all frequency points first and find available PLMNs, and then selects a cell that has a best signal and belongs to the selected PLMN, the SA user end will not select the subordinate cells of the DU when re-performing cell selection by modifying the PLMN to which each cell belongs. Therefore, the SA user end selects other cells for network access. Whereas, the NSA user end obtains PLMN lists from other base stations (4G base stations) covering the same cell, so that the NSA user end may continue to access the network service of the original cell without re-selecting a cell, thereby improving the overall network access efficiency and equipment utilization while guaranteeing that both the NSA user end and the SA user end successfully access the available network.

Figure 6:
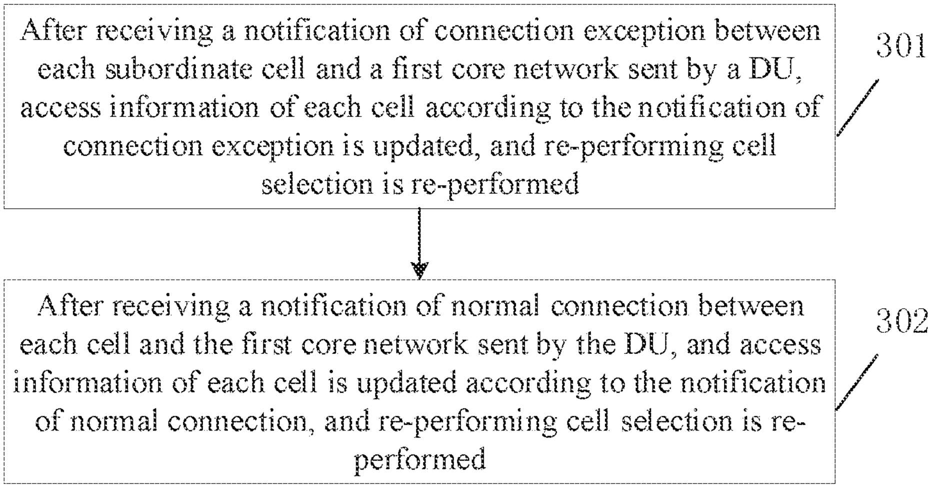
FIG. 6 is a flowchart of a network connection exception processing method applied to an SA user end provided by an embodiment of the present application.

In an example, a network connection exception processing method, as shown in FIG. 6, further includes:

step 301, after receiving a notification of connection exception between each subordinate cell and a first core network sent by a DU, access information of each cell according to the notification of connection exception is updated, and cell selection is re-performed, wherein the notification of connection exception is sent by the DU after receiving first core network connection exception information sent by a CU;

step 302, after receiving a notification of normal connection between each cell and the first core network sent by the DU, and access information of each cell is updated according to the notification of normal connection, and cell selection is re-performed, wherein the notification of normal connection is sent by the DU after receiving first core network normal connection information sent by the CU.

Step 301 is the same as the above network connection exception processing method applied to the SA user end, which will not be described in detail.

Specifically, in step 302, the SA user end may receive a normal connection notification message from a specific message receiving frequency band, may update locally stored cell selection message by reading cell selection related information issued from the DU in the system message to re-perform cell selection, re-accesses the network service of the original cell, and migrates back to the original subordinate cell of the DU for residence. Therefore, the number of user ends accessing other cells is reduced, and further overall network access efficiency and equipment utilization are improved.

The SA user end is instructed to update access information of each cell under the common action of the CU and the DU, and to re-perform cell selection, so that it may be guaranteed that the SA user end successfully accesses the available network service of other cells, and the dual-mode base station still maintains the network connection service of the NSA user end, without re-performing cell selection for accessing the available network, thereby improving the overall network access efficiency and equipment utilization while guaranteeing successful access of the NSA user end and the SA user end to the available network.

Figure 7:
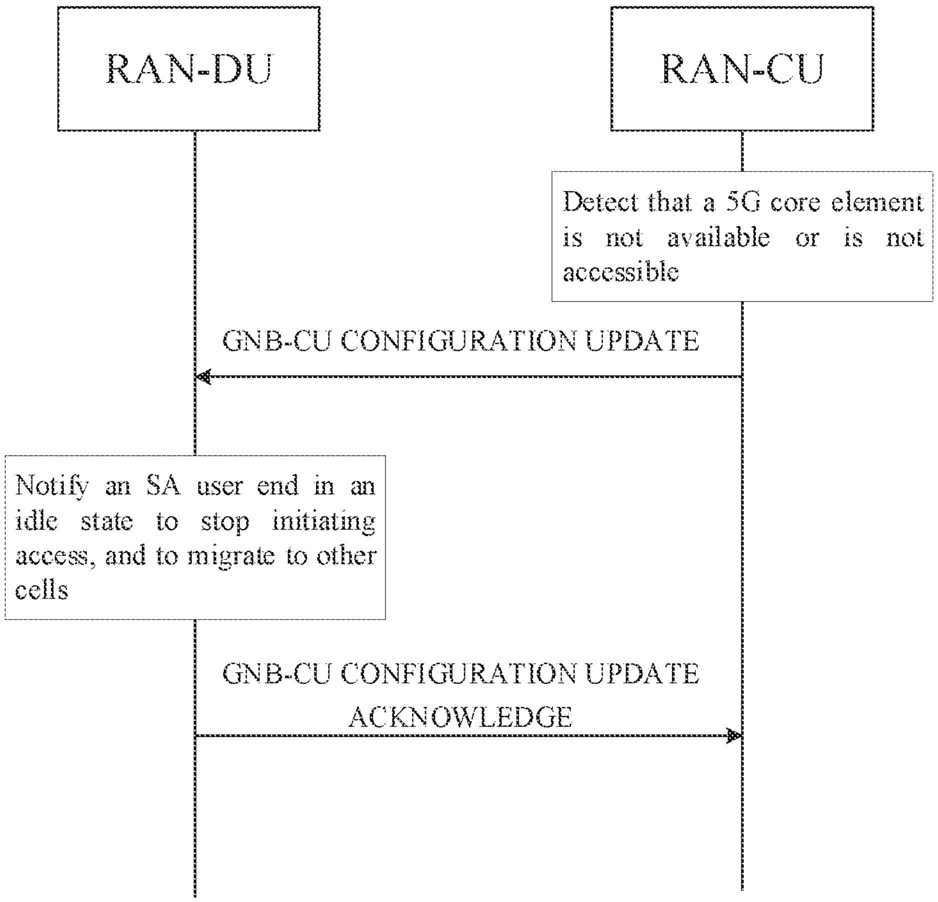
FIG. 7 is an interactive flowchart illustrating that a CU sends 5G core connection exception information to a DU provided by an embodiment of the present application.
Figure 8:
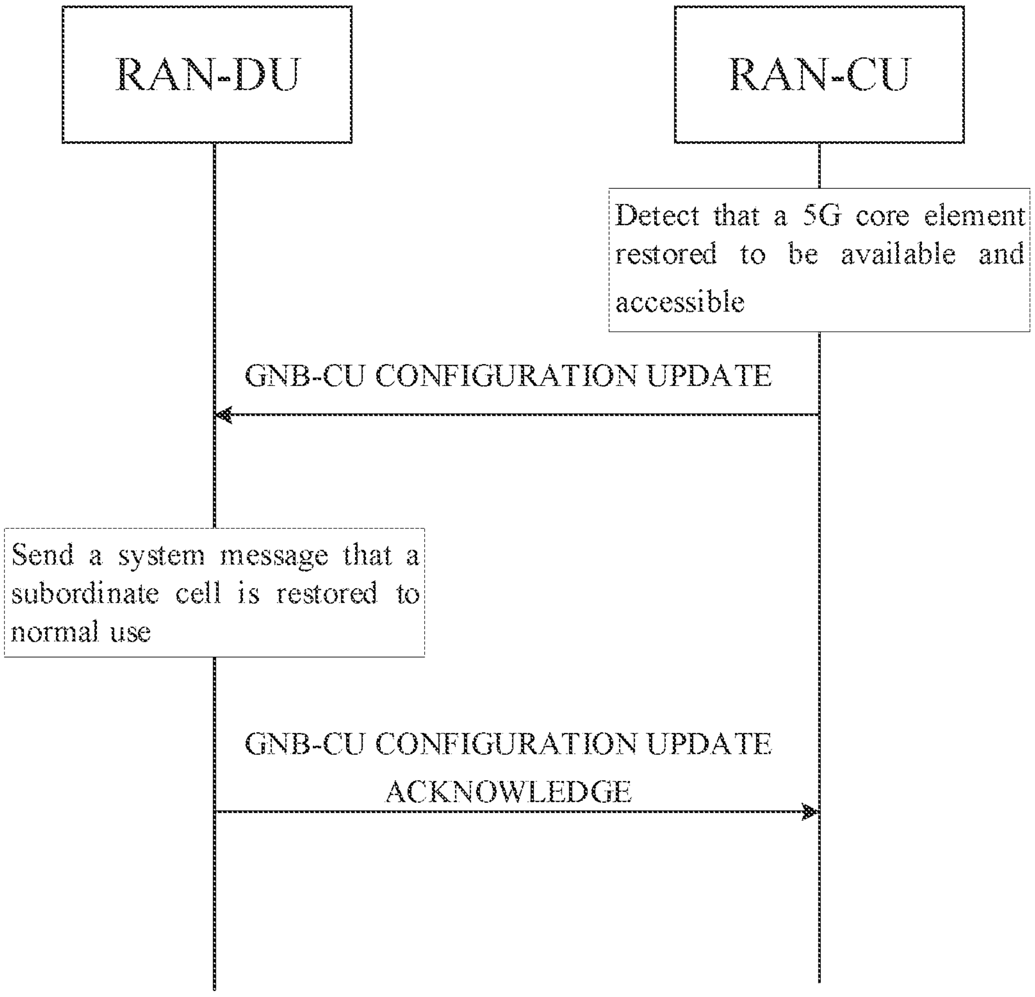
FIG. 8 is an interactive flowchart illustrating a CU sends 5G core normal connection information to a DU provided by an embodiment of the present application.

In an embodiment of the present application, as shown in FIG. 7, when gNB-CU of a 5G dual-mode base station detects that all failures of an NG interface between the gNB-CU and the 5G core, i.e., a 5G core element is not available or is not accessible, gNB-DU is notified in the following manner: gNB-CU sends GNB-CU CONFIGURATION UPDATE message containing element NG Interface state=Not Available to gNB-DU, so as to notify gNB-DU that the current NG interface is interrupted. When gNB-DU of the 5G dual-mode base station receives the GNB-CU CONFIGURATION UPDATE message, an SA user end that is in an idle state and resides in a subordinate cell of the DU is notified to stop initiating access by modifying a system message of the subordinate cells and re-selects other cells for network access, i.e., migrates to other cells. Then, gNB-DU sends a GNB-CU CONFIGURATION UPDATE ACKNOWLEDGE message to gNB-CU so as to notify gNB-CU that the interruption of the NG interface has been processed. When gNB-CU detects that the NG interface between gNB-CU and the 5G core restores to an available state, as shown in FIG. 8, gNB-CU sends a GNB-CU CONFIGURATION UPDATE message containing element cell NG Interface state=Available to the gNB-DU so as to notify gNB-DU that the current NG interface is restored. gNB-DU broadcasts a system message for restoring normal use of the subordinate cell after receiving the GNB-CU CONFIGURATION UPDATE message, and then gNB-DU sends a GNB-CU CONFIGURATION UPDATE ACKNOWLEDGE message to gNB-CU so as to notify gNB-CU that the restoration problem of the NG interface has been processed.

In an embodiment of the present application, when gNB-CU of the 5G dual-mode base station detects all failures of the NG interface between the gNB-CU and the 5G core, gNB-DU is notified in the following manner: gNB-CU sends a GNB-CU CONFIGURATION UPDATE message to gNB-DU, wherein a length of an element cells to be Activated List. Cells to be Activated List Item. Available PLMN List is set to 0, so as to notify gNB-DU that the current NG interface is interrupted. When the GNB-CU CONFIGURATION UPDATE message is received by gNB-DU of the 5G dual-mode base station, an SA user end that is in an idle state and resides in the subordinate cell of the DU is notified to stop initiating access by modifying the system message of the subordinate cell and reselects other cells for network access. Then, NB-DU sends a GNB-CU CONFIGURATION UPDATE ACKNOWLEDGE message to gNB-CU so as to notify gNB-CU that the interruption of the NG interface has been processed. When gNB-CU detects that the NG interface between gNB-CU and the 5G core restores to an available state, gNB-CU sends a GNB-CU CONFIGURATION UPDATE message to gNB-DU, wherein an element Cells to be Activated List. Cells to be Activated List Item. The available PLMN List is filled with actual and available PLMN information, so as to notify gNB-DU that the current NG interface is restored. gNB-DU broadcasts a system message for restoring normal use of the subordinate cell after receiving the GNB-CU CONFIGURATION UPDATE message, and then gNB-DU sends a GNB-CU CONFIGURATION UPDATE ACKNOWLEDGE message to gNB-CU so as to notify gNB-CU that the restoration problem of the NG interface has been processed.

In an embodiment of the present application, when gNB-CU of the 5G dual-mode base station detects all failures of the NG interface between the gNB-CU and the 5G core, gNB-DU is notified in the following manner: gNB-CU sends a GNB-CU CONFIGURATION UPDATE message to gNB-DU, wherein a length of an element cells to be Activated List. Cells to be Activated List Item. Available PLMN List is set to 1, all bits of PLMN Identity in the list is set to 1, so as to notify gNB-DU that the current NG interface is interrupted. When the GNB-CU CONFIGURATION UPDATE message is received by gNB-DU of the 5G dual-mode base station, an SA user end that is in an idle state and resides in the subordinate cell of the DU is notified to stop initiating access by modifying the system message of the subordinate cell and reselects other cells for network access. Then, gNB-DU sends a GNB-CU CONFIGURATION UPDATE ACKNOWLEDGE message to gNB-CU so as to notify gNB-CU that the interruption of the NG interface has been processed. When gNB-CU detects that the NG interface between gNB-CU and the 5G core restores to an available state, gNB-CU sends a GNB-CU CONFIGURATION UPDATE message to gNB-DU, wherein an element Cells to be Activated List. Cells to be Activated List Item. Available PLMN List is filled with actual and available PLMN information, so as to notify gNB-DU that the current NG interface is restored. gNB-DU broadcasts a system message for restoring normal use of the subordinate cell after receiving the GNB-CU CONFIGURATION UPDATE message, and then gNB-DU sends a GNB-CU CONFIGURATION UPDATE ACKNOWLEDGE message to gNB-CU so as to notify gNB-CU that the restoration problem of the NG interface has been processed.

In an embodiment of the application, when gNB-CU of the 5G dual-mode base station detects all failures of the NG interface between the gNB-CU and the 5G core, gNB-DU is notified in the following manner: gNB-CU sends a GNB-CU CONFIGURATION UPDATE message to gNB-DU, wherein a length of an element Cells to be Activated List. Cells to be Activated List Item. gNB-CU System Information. SIB type to Be Updated List. SIB type to Be Updated Item IEs. SIB type is set to 1, and a uac-Barringlnfo element is set in a corresponding SIB message element. An access control class ("AC" for short) of all subordinate cells of the DU is set to barred access, and gNB-DU is notified that the current NG interface is interrupted. When the GNB-CU CONFIGURATION UPDATE message is received by gNB-DU of the 5G dual-mode base station, an SA user end that is in an idle state and resides in the subordinate cell of the DU is notified to stop initiating access by modifying the system message of the subordinate cell and reselects other cells for network access. Then, gNB-DU sends a GNB-CU CONFIGURATION UPDATE ACKNOWLEDGE message to gNB-CU so as to notify gNB-CU that the interruption of the NG interface has been processed. When gNB-CU detects that the NG interface between gNB-CU and the 5G core work restores to an available state, gNB-CU sends a GNB-CU CONFIGURATION UPDATE message to gNB-DU, wherein a length of an element Cells to be Activated List. Cells to be Activated List Item. gNB-CU System Information. SIB type to Be Updated List. SIB type to Be Updated Item IEs. SIB type is set to 1, and a uac-Barringlnfo element is set in a corresponding SIB message element. ACs of all subordinate cells are set to be accessible, so as to notify gNB-DU that the current NG interface is restored. gNB-DU broadcasts a system message for restoring normal use of the subordinate cell after receiving the GNB-CU CONFIGURATION UPDATE message, and then gNB-DU sends a GNB-CU CONFIGURATION UPDATE ACKNOWLEDGE message to gNB-CU so as to notify gNB-CU that the restoration problem of the NG interface has been processed.

Figure 9:
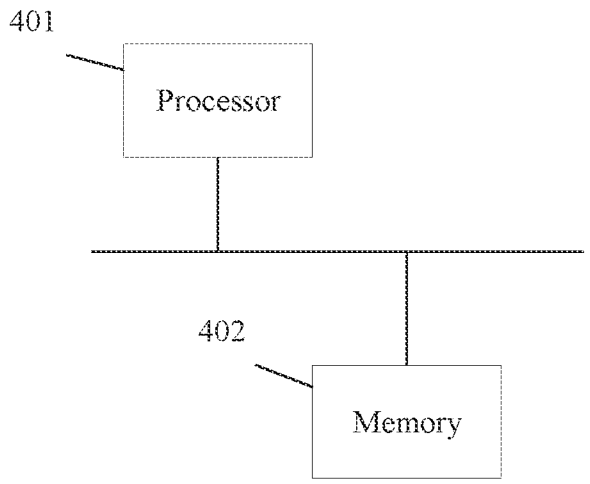
FIG. 9 is a schematic diagram of an electronic device provided by an embodiment of the present application.

An embodiment of the present application also relates to an electronic device, as shown in FIG. 9, including: at least one processor 401; a memory 402 in communication connection with the at least one processor. The memory 402 stores instructions executable by the at least one processor 401, and the instructions are executed by the at least one processor 401 to perform the above network connection exception processing method applied to the CU or the DU, or to perform the above network connection exception processing method applied to the SA user end.

The memory 402 and the processor 401 are connected by way of a bus. The bus may include any number of interconnecting buses and bridges, and the bus connects various circuits of the one or more processors 401 and the memory 402 together. The bus may also connect various other circuits such as peripherals, voltage regulators, and power management circuits, which are well known in the art, and therefore, will not be described further herein. A bus interface provides an interface between the bus and a transceiver. The transceiver may be an element or a plurality of elements, such as a plurality of receivers and transmitters, and provides a unit in communication with various other apparatuses over a transmission medium. The information processed by the processor 401 is transmitted over a wireless medium through an antenna, and further, the antenna receives the information and delivers the information to the processor 401.

The processor 401 is responsible for bus management and general processing, and may also provide various functions including timing, peripheral interfaces, voltage regulation, power management and other control functions. The memory 402 may be configured to store information for use by the processor in performing operations.

An embodiment of the application also relates to a computer-readable storage medium storing a computer program thereon. The computer program, when executed by a processor, implements the above method embodiments.

That is, it can be understood by those skilled in the art that, all or a part of the steps in the method embodiments may be implemented by instructing associated hardware through a program, wherein the program is stored in a storage medium and includes a plurality of instructions configured to cause a device (which may be a single chip microcomputer, a chip, etc.) or a processor to perform all or a part of the steps in the method embodiments of the present application. The aforementioned storage medium includes various media capable of storing codes, such as a USB flash disk, a removable hard disk, a Read-Only Memory (ROM), a Random Access Memory (RAM), a magnetic disk, or an optical disk.

It will be understood by those of ordinary skill in the art that the above embodiments are specific embodiments for implementing the present application, and that various changes may be made in form and detail in actual application without departing from the spirit and scope of the present application.

What is claimed is:

1. A network connection exception processing method, applied to a distributed unit (DU) of a dual-mode base station, the method comprising:

sending, after receiving a first core network connection exception information sent by a centralized unit (CU), a notification of connection exception between each subordinate cell and the first core network for a standalone (SA) user end to read and update access information of each cell according to the notification of the connection exception, and to re-perform cell selection, wherein not all the subordinate cells are stopped from service, the dual-mode base station being configured for the SA network and a non-standalone (NSA) network simultaneously, and comprising the DU and the CU that are in communication connection, the CU being configured to establish a connection with a first core network and a second core network, respectively, and to perform data transmission between an SA user end and the first core network and data transmission between an NSA user end and the second core network through the DU.

2. The network connection exception processing method according to claim 1, wherein, the sending a notification of connection exception between each subordinate cell and the first core network to the SA user end comprises:

carrying a cell barring information element, and/or a cell reservation information element in a periodically broadcasted system message, the cell barring information element and/or the cell reservation information element being configured to indicate cells having connection exception with the first core network;

wherein, the cell barring element and the cell reservation element are located at a reading location for the SA user end in the system message.

3. The network connection exception processing method according to claim 1, wherein, the first core network connection exception information is indicated by a first public land mobile network (PLMN) list sent by the CU;

after the receiving a first core network connection exception information sent by the centralized unit (CU), the method further comprises:

updating a stored second PLMN list according to the first PLMN list; and the sending a notification of connection exception between each subordinate cell and the first core network, comprises: carrying the updated second PLMN list in the periodically broadcasted system message, the second PLMN list being used by the SA user end to select a PLMN identity before the cell selection.

4. The network connection exception processing method according to claim 1, wherein, the method further comprises:

sending, after receiving first core network connection restoring information sent by the CU, a notification of normal connection between each cell and the first core network, for the SA user end to read and update access information of each cell according to the notification of normal connection, and to re-perform cell selection.

5. A network connection exception processing method, applied to a centralized unit (CU) of a dual-mode base station, the method comprising:

sending, after detecting connection exception with the first core network, first core network connection exception information to a distributed unit (DU), for the DU to send a notification of connection exception between each subordinate cell and the first core network, the notification of connection exception being configured to instruct the SA user end to update access information of each cell, and to re-perform cell selection, wherein not all the subordinate cells are stopped from service, the dual-mode base station being configured for the SA network and a non-standalone (NSA) network simultaneously, and comprising the DU and the CU that are in communication connection, the CU being configured to establish a connection with a first core network and a second core network, respectively, and to perform data transmission between an SA user end and the first core network and data transmission between an NSA user end and the second core network through the DU; and maintaining a connection with the second core network through the services of all the subordinate cells.

6. The network connection exception processing method according to claim 5, wherein, the sending first core network connection exception information to the distributed unit (DU), comprises:

sending signaling carrying a first PLMN list to the DU, the first core network connection exception information is indicated by the first PLMN list, the signaling is configured to instruct the DU to update a stored second PLMN list, and the updated second PLMN list is configured to be carried in a system message periodically broadcasted by the DU for the SA user end to select a PLMN identity before performing the cell selection.

7. The network connection exception processing method according to claim 5, wherein, the method further comprises:

sending, after detecting normal connection with the first core network, first core network connection restoring information to the DU, for the DU to send a notification of normal connection between each cell and the first core network to the SA user end, the notification of normal connection is configured to instruct the SA user end to update access information of each cell, and to re-perform cell selection.

8. A network connection exception processing method, applied to an SA user end, the method comprising:

updating, after receiving a notification of connection exception between each subordinate cell and the first core network sent by a distributed unit (DU), access information of each cell according to the notification of connection exception, and re-performing cell selection, wherein the notification of connection exception is sent by the DU after receiving first core network connection exception information sent by a centralized unit (CU), wherein not all the subordinate cells are stopped from service, the SA user end performing data transmission with the first core network through a dual-mode base station, the dual-mode base station being configured for a standalone (SA) network and a non-standalone (NSA) network simultaneously, and comprising the DU and the CU that are in communication connection, the CU being configured to establish connection with a first core network and a second core network respectively, and to perform data transmission between the SA user end and the first core network and data transmission between an NSA user end and the second core network through the DU.

9. The network connection exception processing method according to claim 8, wherein, the method further comprises:

updating, after receiving a notification of normal connection between each cell and the first core network sent by the DU, access information of each cell according to the notification of normal connection, and re-performing cell selection; the notification of normal connection is sent by the DU after receiving the first core network normal connection information sent by the CU.

10. An electronic device, comprising:

at least one processor;

a memory in communication connection with the at least one processor; wherein the memory stores instructions executable by the at least one processor, and the instructions are executed by the at least one processor such that the at least one processor may perform the network connection exception processing method of claim 1.

* * * * *